(12) United States Patent
Sanders et al.

(10) Patent No.: US 7,734,008 B1
(45) Date of Patent: Jun. 8, 2010

(54) VEHICLE CARGO INSPECTION STATION AND ASSOCIATED METHOD

(76) Inventors: George Sanders, 1300 W. Belmont Ave., Chicago, IL (US) 60657; Christian Dela Torre, 7504 Laramie Ave., Skokie, IL (US) 60077

( * ) Notice: Subject to any disclaimer, the term of this patent is extended or adjusted under 35 U.S.C. 154(b) by 306 days.

(21) Appl. No.: 11/805,337

(22) Filed: May 24, 2007

(51) Int. Cl.
*G01N 23/02* (2006.01)
*H05G 1/02* (2006.01)
*H05G 1/00* (2006.01)

(52) U.S. Cl. .......................... 378/57; 378/198; 378/210
(58) Field of Classification Search .................. 378/57, 378/70, 198, 210
See application file for complete search history.

(56) References Cited

U.S. PATENT DOCUMENTS

| | | | | |
|---|---|---|---|---|
| 3,308,740 | A * | 3/1967 | Henson et al. | 454/188 |
| 5,255,695 | A * | 10/1993 | Downey | 134/123 |
| 5,638,420 | A * | 6/1997 | Armistead | 378/57 |
| 5,764,683 | A | 6/1998 | Swift | |
| 5,769,011 | A * | 6/1998 | Daniel | 109/7 |
| 6,031,890 | A | 2/2000 | Bermbach | |
| 6,249,567 | B1 | 6/2001 | Rothschild | |
| 6,542,580 | B1 * | 4/2003 | Carver et al. | 378/57 |
| 7,356,115 | B2 * | 4/2008 | Ford et al. | 378/57 |
| 7,453,987 | B1 * | 11/2008 | Richardson | 378/98.9 |
| 7,551,714 | B2 * | 6/2009 | Rothschild | 378/46 |
| 2004/0258198 | A1 * | 12/2004 | Carver et al. | 378/57 |
| 2005/0157844 | A1 * | 7/2005 | Bernardi et al. | 378/57 |
| 2006/0098773 | A1 * | 5/2006 | Peschmann | 378/57 |
| 2006/0251211 | A1 * | 11/2006 | Grodzins et al. | 378/57 |
| 2007/0280416 | A1 * | 12/2007 | Bendahan et al. | 378/57 |
| 2008/0226025 | A1 * | 9/2008 | Harding et al. | 378/44 |
| 2008/0298545 | A1 * | 12/2008 | Bueno et al. | 378/57 |

* cited by examiner

*Primary Examiner*—Edward J Glick
*Assistant Examiner*—Anastasia Midkiff (57) ABSTRACT

A vehicle cargo inspection station includes a building structure that has open first and second ends and a top portion forming a passageway therein. A mechanism automatically scans the cargo area of the existing vehicle. The scanning mechanism is movable within the passageway while the existing vehicle remains stationary such that cargo within the existing vehicle remains statically housed therein. The building structure is manufactured of durable and rigid material such that the structure provides a barrier between the scanning mechanism and the outside environment thereby protecting the scanning mechanism from damage by harsh environmental conditions.

7 Claims, 8 Drawing Sheets

VEHICLE CARGO INSPECTION STATION AND ASSOCIATED METHOD

CROSS REFERENCE TO RELATED APPLICATIONS

Not applicable

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Technical Field

This invention relates to inspection systems and, more particularly, to a vehicle cargo inspection station and associated method for providing a visual display of contents contained within the closed cargo area of an existing vehicle.

2. Prior Art

Studies by agencies have shown that many vehicles are packaged into containers or standard trucks and are smuggled out of a country. Since it is difficult and time-consuming to check trucks and containers, the number of detected crimes of this sort is small. In addition, smaller types of contraband are also secured within the interiors of various sized vehicles depending on the size and type of contraband. One solution for detecting such cargo, is container radiation systems that have been commercially available for a few years. However, one essential aspect in detecting such cargo is to produce the best possible image for examining whether a particular cargo in general corresponds to an associated shipping list. Of course, it is simultaneously possible to discover certain smuggled goods in this process.

One prior art example shows an inspection system for inspecting a vehicle moving at a grade of travel over a surface and for detecting material disposed within or on the underside of the vehicle. The system has a source for providing a generally upward or downward pointing beam of penetrating radiation of specified cross-section so as to illuminate vehicles driven above or below the source of radiation. A detector arrangement, disposed below the grade of travel, detects radiation from the beam scattered by any material disposed on the underside of the moving vehicle and generates a scattered radiation signal that may be used for characterizing the material disposed on the underside of the vehicle. Similarly, a detector arrangement disposed above the vehicle generates a scattered radiation signal that may be used for characterizing the material disposed within the vehicle. Unfortunately, this prior art example does not provide a means of examining the contents of a vehicle from the side as well as simultaneously from the top.

A monitoring installation for containers and trucks is provided making detection of large items, particularly trucks, at minimal expense possible. An X-ray monitoring installation having low X-ray energy permits detection of stolen passenger cars, and is arranged on a monitoring path. Unfortunately, this prior art example is not designed for detecting smaller types of contraband hidden within the interior spaces of existing vehicles.

Accordingly, a need remains for a vehicle cargo inspection station and associated method in order to overcome the above-noted shortcomings. The present invention satisfies such a need by providing a system that is convenient and easy to use, that is durable in design, and provides a visual display of contents contained within the closed cargo area of an existing vehicle. The system makes it possible to inspect trucks more easily and can aid law enforcement agencies in combating smuggling and terrorism. Such a system may also save tax-payer dollars by streamlining inspection processes. The present invention is simple to use and designed for many years of repeated use.

BRIEF SUMMARY OF THE INVENTION

In view of the foregoing background, it is therefore an object of the present invention to provide a system for a vehicle cargo inspection station and associated method. These and other objects, features, and advantages of the invention are provided by a vehicle cargo inspection station for providing a visual display of contents contained within the closed cargo area of an existing vehicle.

The system includes a building structure that has open first and second ends and a top portion respectively such that a continuous passageway is effectively formed within an interior of the structure. Such a passageway of the structure is suitably shaped and sized such that a plurality of existing vehicles are advantageously driven into the first end of the structure and subsequently driven out of the second end of the structure. The structure has a sufficient longitudinal length such that respective front and rear ends of the existing vehicle are inwardly spaced from the respective second and first ends of the structure in such a manner that the existing vehicle is wholly contained within the interior of the structure during operating conditions.

The system further includes a mechanism for automatically scanning the cargo area of the existing vehicle. Such an automatic scanning mechanism is movable within the passageway while the existing vehicle remains stationary such that cargo within the existing vehicle remains statically housed therein. The building structure is conveniently manufactured of durable and rigid material such that the structure effectively provides a barrier between the automatic scanning mechanism and the outside environment thereby advantageously protecting the automatic scanning mechanism from damage by harsh environmental conditions.

The automatic scanning mechanism includes an elevated platform housed within the interior of the structure that has a horizontally oriented planar top surface. Such a platform has a longitudinal length equal to a longitudinal length of the structure. The platform has a plurality of ramps conveniently provided with second ends monolithically formed with respective opposed ends of the platform, and each of the second ends of the ramps has a vertical height equal to a vertical height of the top surface of the platform. Each of such ramps has a first end extending downwardly and away from the second ends and is directly abutted against a ground surface. Each of the ramps has a planar top surface effectively extending between the respective first and second ends of the ramps such that the top surfaces of the ramps rise vertically at a predetermined angle thereby advantageously allowing the existing vehicle to be easily positioned upon the top surface of the platform during scanning procedures.

The automatic scanning mechanism further includes a plurality of driven tracks conveniently housed within an interior portion of the platform. Each of such driven tracks is located subjacent to the top surface of the platform and adjacent to laterally opposed outside edges of the platform. Each of the driven tracks has a longitudinal length registered parallel to the longitudinal length of the platform. A motor is directly coupled to each of the plurality of driven tracks respectively. Such a motor is conveniently housed within the interior portion of the platform and further is located subjacent to the top surface of the platform. The motor effectively applies a rotational force to each of the respective driven tracks simultaneously during operating conditions.

The automatic scanning mechanism further includes a movable cargo scanner that has a closed end, and a plurality of legs oriented opposite to the closed end such that an inverted U-shape is effectively formed. Each of such legs has a bottom end directly attached to an associated one of the driven tracks. Each of the legs has a top end monolithically formed with the closed end of the scanner such that the closed end is sufficiently spaced above the top surface of the platform to advantageously allow the existing vehicle to simultaneously pass beneath the closed end and between the legs of the scanner respectively during scanning procedures.

The scanner is effectively moved along a first linear path corresponding to the longitudinal length of the platform when a rotational force from the motor is applied to the driven tracks during scanning procedures. The scanner is effectively moved along a second linear path opposite to the first linear path, and returned to an equilibrium position when the scanning procedures are completed. The first and second linear paths conveniently extend along an entire longitudinal length of the platform.

The automatic scanning mechanism further includes a plurality of sensors coupled to the scanner. Such sensors effectively detect the existing vehicle positioned upon the platform when the scanner moves along the first linear path thereby advantageously initiating the scanning procedures during operating conditions. A processor is electrically coupled to the scanner, and a memory is electrically coupled to the processor. Such a memory includes software instructions that cause the scanner to display an image of the cargo. Such software instructions are programmable and execute a logic algorithm including the steps of capturing an image of the cargo, transmitting the image information to the processor, decoding the image into a plurality of independent data streams corresponding to a level of predetermined high risk materials, measuring reflected light of a specific frequency originating from the cargo, and generating an output signal corresponding to the reflected light frequency of the cargo.

The automatic scanning mechanism further includes a display screen electrically coupled to the processor and the scanner respectively. Such a display screen includes a graphical user interface electrically mated thereto for effectively generating images of the cargo on the display screen. Such a graphical user interface advantageously receives and directly manipulates the output signal to a plurality of widgets displayed on the display screen so that the operator can quickly and easily identify a threat level of the detected cargo. A controller is electrically coupled to the processor and the scanner and the motor respectively. Such a controller includes a user interface that allows an operator to manually operate the scanner during scanning procedures.

A method for providing a visual display of contents contained within the closed cargo area of an existing vehicle includes the steps of providing a building structure that has open first and second ends and a top portion respectively such that a continuous passageway is formed within an interior of the structure, and automatically scanning the cargo area of the existing vehicle by moving a scanner along the passageway while the existing vehicle remains stationary such that cargo within the existing vehicle remains statically housed therein. The building structure is manufactured of durable and rigid material such that the structure provides a barrier between the scanner and the outside environment.

The method further includes the steps of driving a plurality of existing vehicles into the first end of the structure and subsequently driving the plurality of existing vehicles out of the second end of the structure. The structure has a sufficient longitudinal length such that respective front and rear ends of the existing vehicle are inwardly spaced from the respective second and first ends of the structure in such a manner that the existing vehicle is wholly contained within the interior of the structure during operating conditions.

The method of automatically scanning the cargo area of the existing vehicle includes the steps of housing an elevated platform within the interior of the structure. Such a platform has a horizontally oriented planar top surface and further has a longitudinal length equal to a longitudinal length of the structure. The platform has a plurality of ramps provided with second ends monolithically formed with respective opposed ends of the platform, and each of the second ends of the ramps has a vertical height equal to a vertical height of the top surface of the platform. Each of the ramps has a first end extending downwardly and away from the second ends and is directly abutted against a ground surface. Each of the ramps has a planar top surface extending between the respective first and second ends of the ramps such that the top surfaces of the ramps rise vertically at a predetermined angle thereby allowing the existing vehicle to be easily positioned upon the top surface of the platform during scanning procedures.

The method of automatically scanning the cargo area of the existing vehicle further includes the steps of housing a plurality of driven tracks within an interior portion of the platform. Each of such driven tracks is located subjacent to the top surface of the platform and adjacent to laterally opposed outside edges of the platform. Each of the driven tracks has a longitudinal length registered parallel to the longitudinal length of the platform. The steps further include directly coupling a motor to each of the plurality of driven tracks respectively. Such a motor is housed within the interior portion of the platform and further is located subjacent to the top surface of the platform. The motor applies a rotational force to each of the respective driven tracks simultaneously during operating conditions.

The method of automatically scanning the cargo area of the existing vehicle further includes the steps of providing a movable cargo scanner that has a closed end and a plurality of legs oriented opposite to the closed end such that an inverted U-shape is formed. Each of such legs has a bottom end directly attached to an associated one of the driven tracks. Each of the legs has a top end monolithically formed with the closed end of the scanner such that the closed end is sufficiently spaced above the top surface of the platform to allow the existing vehicle to simultaneously pass beneath the closed end and between the legs of the scanner respectively during scanning procedures.

The method of automatically scanning the cargo area of the existing vehicle further includes the steps of moving the scanner along a first linear path corresponding to the longitudinal length of the platform when a rotational force from the motor is applied to the driven tracks during scanning procedures, and moving the scanner along a second linear path opposite to the first linear path such that the scanner is returned to an equilibrium position when the scanning procedures are completed. The first and second linear paths extend along an entire longitudinal length of the platform.

The method of method of automatically scanning the cargo area of the existing vehicle further includes the steps of coupling a plurality of sensors to the scanner. Such sensors detecting the existing vehicle positioned upon the platform when the scanner moves along the first linear path thereby initiating the scanning procedures during operating conditions. The steps further include electrically coupling a processor to the scanner, and electrically coupling a memory to the processor. Such a processor includes software instructions that cause the scanner to display an image of the cargo.

Such software instructions are programmable and execute a logic algorithm including the steps of capturing an image of the cargo, transmitting the image information to the processor, decoding the image into a plurality of independent data streams corresponding to a level of predetermined high risk materials, measuring reflected light of a specific frequency originating from the cargo, and generating an output signal corresponding to the reflected light frequency of the cargo.

The method of automatically scanning the cargo area of the existing vehicle further includes the steps of electrically coupling a display screen to the processor and the scanner respectively. Such a display screen includes a graphical user interface electrically mated thereto for generating images of the cargo on the display screen. Such a graphical user interface receives and directly manipulates the output signal to a plurality of widgets displayed on the display screen so that the operator can quickly and easily identify a threat level of the detected cargo. The steps further include electrically coupling a controller to the processor and the scanner and the motor respectively. Such a controller includes a user interface that allows an operator to manually operate the scanner during scanning procedures.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-8 by the reference numeral 10 and is intended to provide a vehicle cargo inspection system and associated method. It should be understood that the system 10 may be used to inspect many different types of cargo in many different types of vehicles and should not be limited in use to inspecting only those types of cargo in those types of vehicles described herein.

Referring initially to FIGS. 1, 2, 3, 4, 5, 6 and 7, the system 10 includes a building structure 20 that has open first 21 and second 22 ends and a top portion 23 respectively, which is essential such that a continuous passageway 24 is formed within an interior of the structure 20. Such a passageway 24 of the structure 20 is suitably shaped and sized such that a plurality of existing vehicles 11 are driven into the first end 21 of the structure 20 and subsequently driven out of the second end 22 of the structure 20. The structure 20 has a sufficient longitudinal length, which is critical such that respective front 12 and rear 13 ends of the existing vehicle 11 are inwardly spaced from the respective second and first ends 22, 21 of the structure 20 in such a manner that the existing vehicle 11 is wholly contained within the interior of the structure 20 during operating conditions. The shape and size of the structure 20 allows a multitude of differently sized commercial and private vehicles 11 to be scanned using the system 10.

Again referring to FIGS. 1 through 7, the system 10 further includes a mechanism 25 for automatically scanning the cargo area of the existing vehicle 11. Such an automatic scanning mechanism 25 is movable within the passageway 24 while the existing vehicle 11 remains stationary such that cargo within the existing vehicle 11 remains statically housed therein. By allowing the existing vehicle 11 to remain stationary during scanning procedures, the operator can obtain a more efficient scan of the cargo contained within the existing vehicle 11. The structure 20 is manufactured of durable and rigid material such that the structure 20 provides a barrier between the automatic scanning mechanism 25 and the outside environment thereby protecting the automatic scanning mechanism 25 from damage by harsh environmental conditions.

Yet again referring to FIGS. 1 through 7, the automatic scanning mechanism 25 includes an elevated platform 26 housed within the interior of the structure 20 that has a horizontally oriented planar top 27 surface. Such a platform 26 provides the necessary structure for housing the motor 41 (herein described below) and the driven tracks 33 (herein described below) respectively therein, and thereby protecting same from damage by existing vehicles 11 during scanning procedures. Such a platform 26 has a longitudinal length equal to a longitudinal length of the structure 20. The platform 26 has a plurality of ramps 32 provided with second ends 28 monolithically formed with respective opposed ends 29 of the platform 26, and each of the second ends 28 of the ramps 32 has a vertical height equal to a vertical height of the top surface 27 of the platform 26.

Still referring to FIGS. 1 through 7, each of such ramps 32 has a first end 30 extending downwardly and away from the second ends 28 and is directly abutted against a ground surface 15, without the use of intervening elements. Each of the ramps 32 has a planar top surface 31 extending between the respective first 30 and second 28 ends of the ramps 32, which is crucial such that the top surfaces 31 of the ramps 32 rise vertically at a predetermined angle thereby allowing the existing vehicle 11 to be easily positioned upon the top surface 27 of the platform 26 during scanning procedures. Such an angle of the ramps 32 allows an existing vehicle 11 to easily reach the top surface 27 of the platform 26 even when loaded with a large amount of heavy cargo.

Various existing x-ray technologies may be employed by the present system 10, such as the system disclosed by U.S. Pat. No. 6,292,533 to Swift, et al. Such a patent discloses a device for inspecting a cargo container such as a motor vehicle or freight pallet, with penetrating radiation. A source of penetrating radiation is mounted on a moveable bed, thereby allowing a beam of penetrating radiation to sweep the large container. At least one detector is also mounted on the bed, either on the side of the source or on a boom, so that, as the beam is scanned across the container, the container and any contents of the container are characterized by transmitted or scattered radiation, or both.

Also, U.S. Patent No. to Geus, et al. discloses an X-ray examining system that includes a mobile vehicle, and an X-ray examining apparatus for ascertaining contents of an object. The examining apparatus includes a supporting structure mounted on the mobile vehicle, an X-ray source for generating a fan-shaped X-ray and being carried by the vehicle, and an X-ray detector mounted on the supporting structure. The X-ray examining system is adapted to travel along the object to be examined while irradiating the object and detecting the X-rays after passage thereof through the object.

While, the underlying scanning technology may be suitable for use with applicant's claimed invention, such systems tend to be expensive, heavy, complex and difficult to transport and set up. Inspection may be slow. Some systems require several days to assemble and disassemble. Other systems are so long and/or heavy, that they require a special road permit to be driven on highways. Therefore, applicant has overcome such prior art shortcomings by providing a more suitable scanning boom that is positional along a longitudinal length of the existing vehicle while the existing vehicle remains stationary within a partially enclosed structure.

Figure 1:
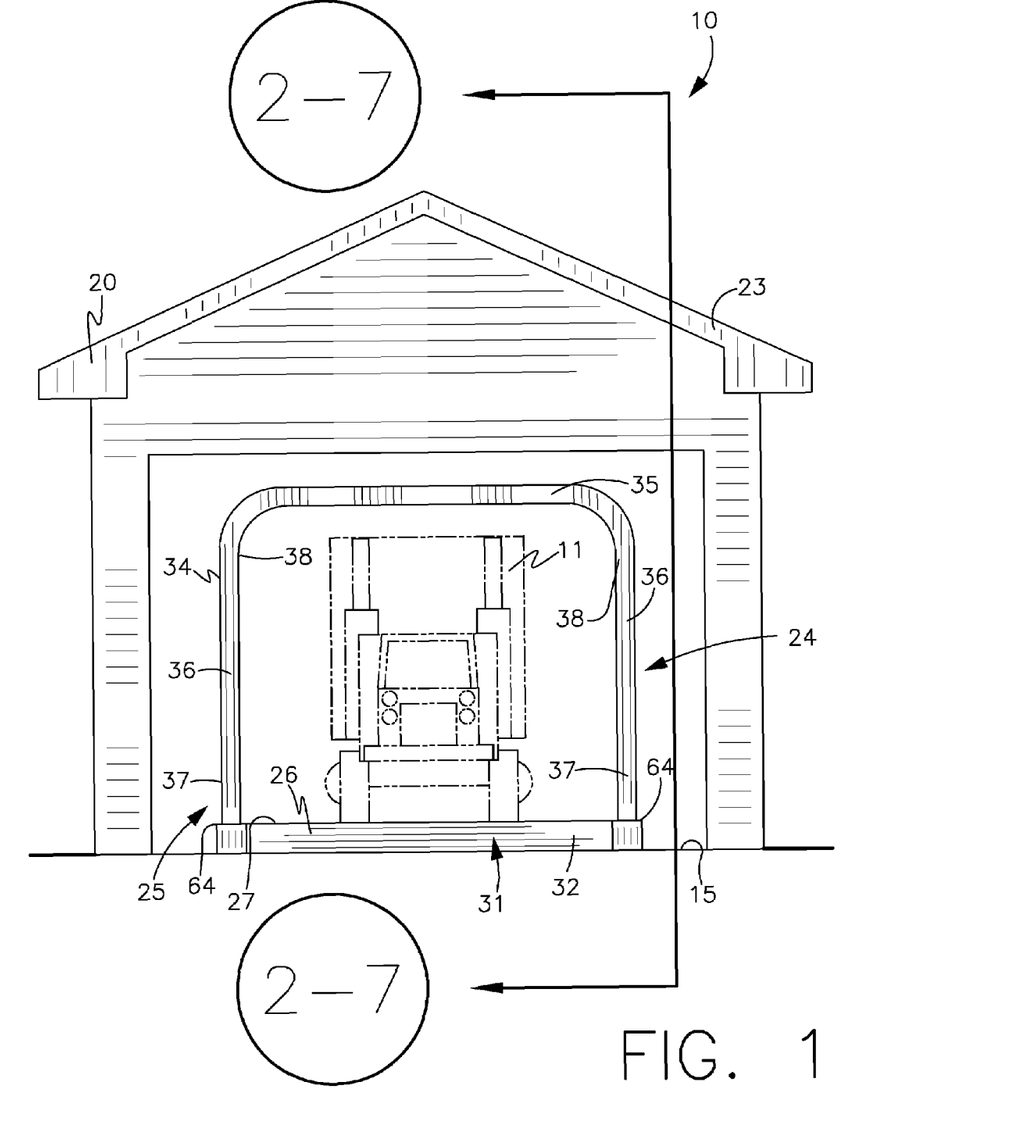
FIG. 1 is a front elevational view of the system showing an existing vehicle positioned within the building structure, in accordance with the present invention.
Figure 2:
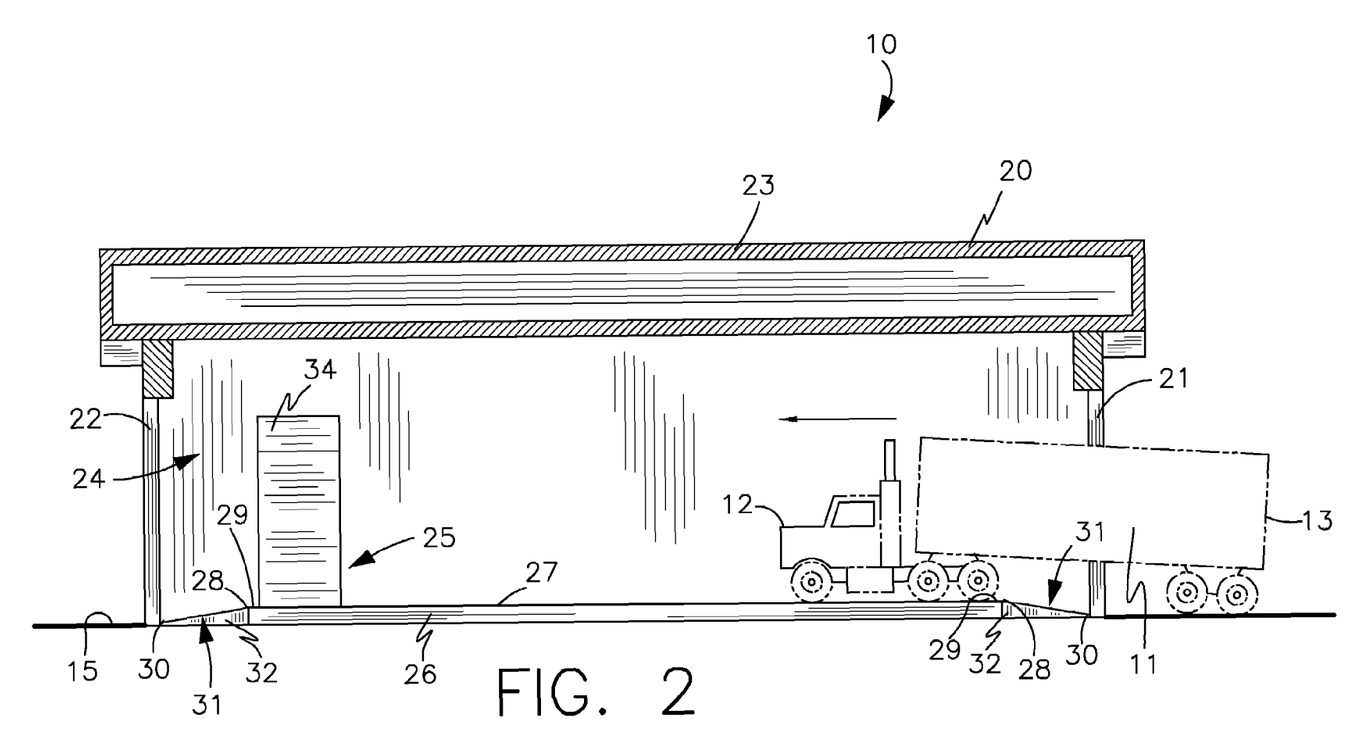
FIG. 2 is a cross sectional view of the system shown in FIG. 1, taken along line 2-7, showing the existing vehicle entering the first end of the building structure.
Figure 3:
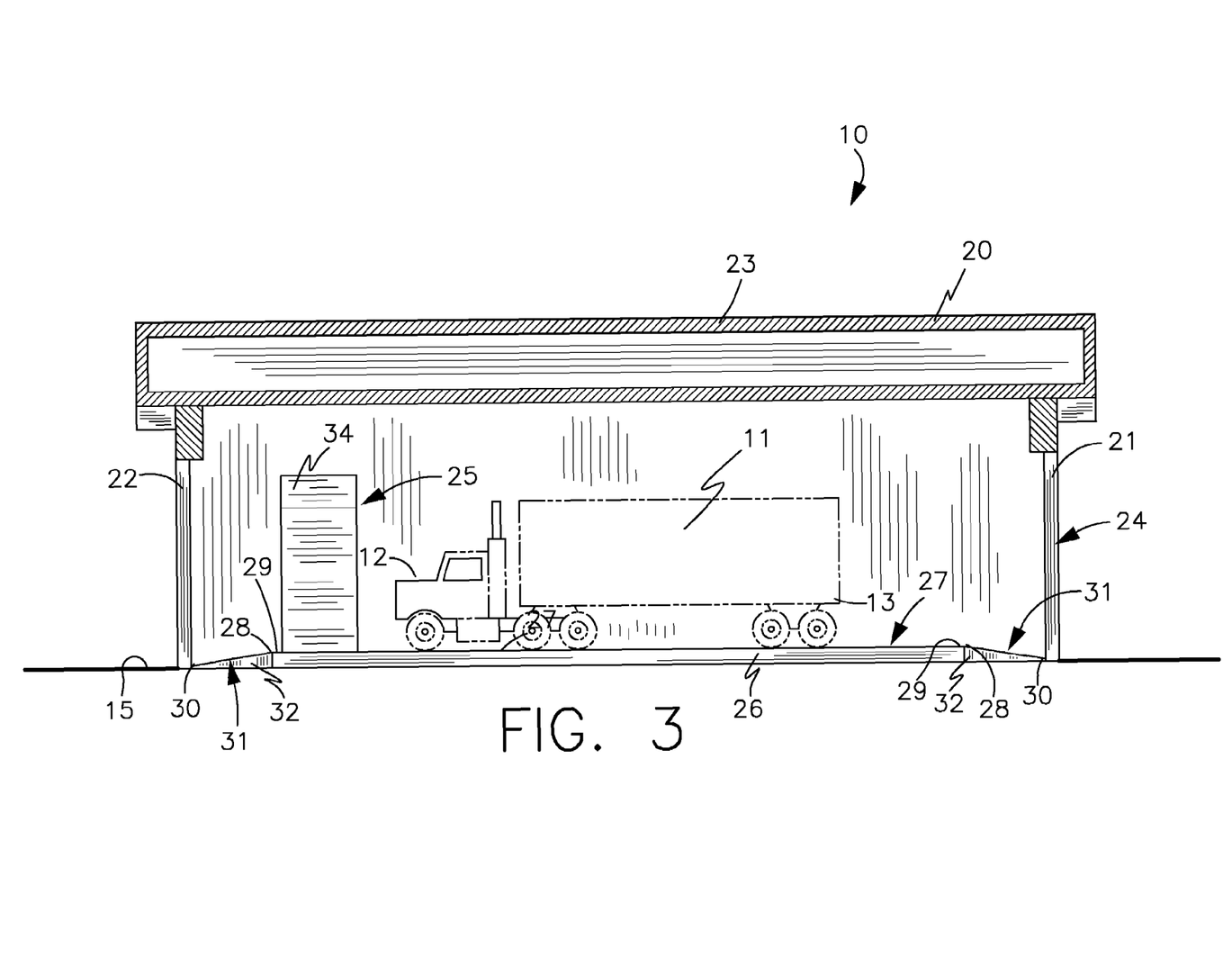
FIG. 3 is a cross sectional view of the system shown in FIG. 1, taken along line 2-7, showing the existing vehicle positioned at a midpoint of the platform.
Figure 4:
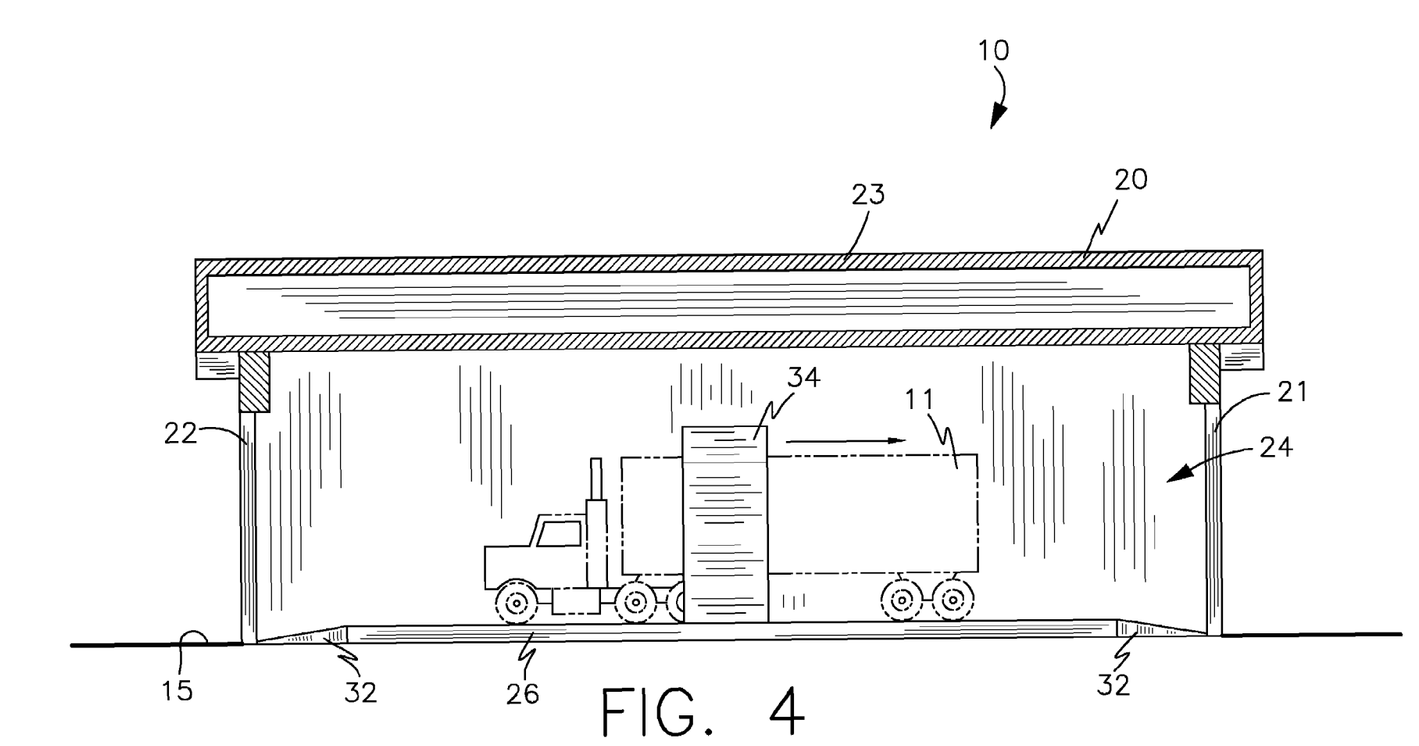
FIG. 4 is a cross sectional view of the system shown in FIG. 1, taken along line 2-7, showing the scanner positioned at the midpoint of the platform during scanning procedures.
Figure 5:
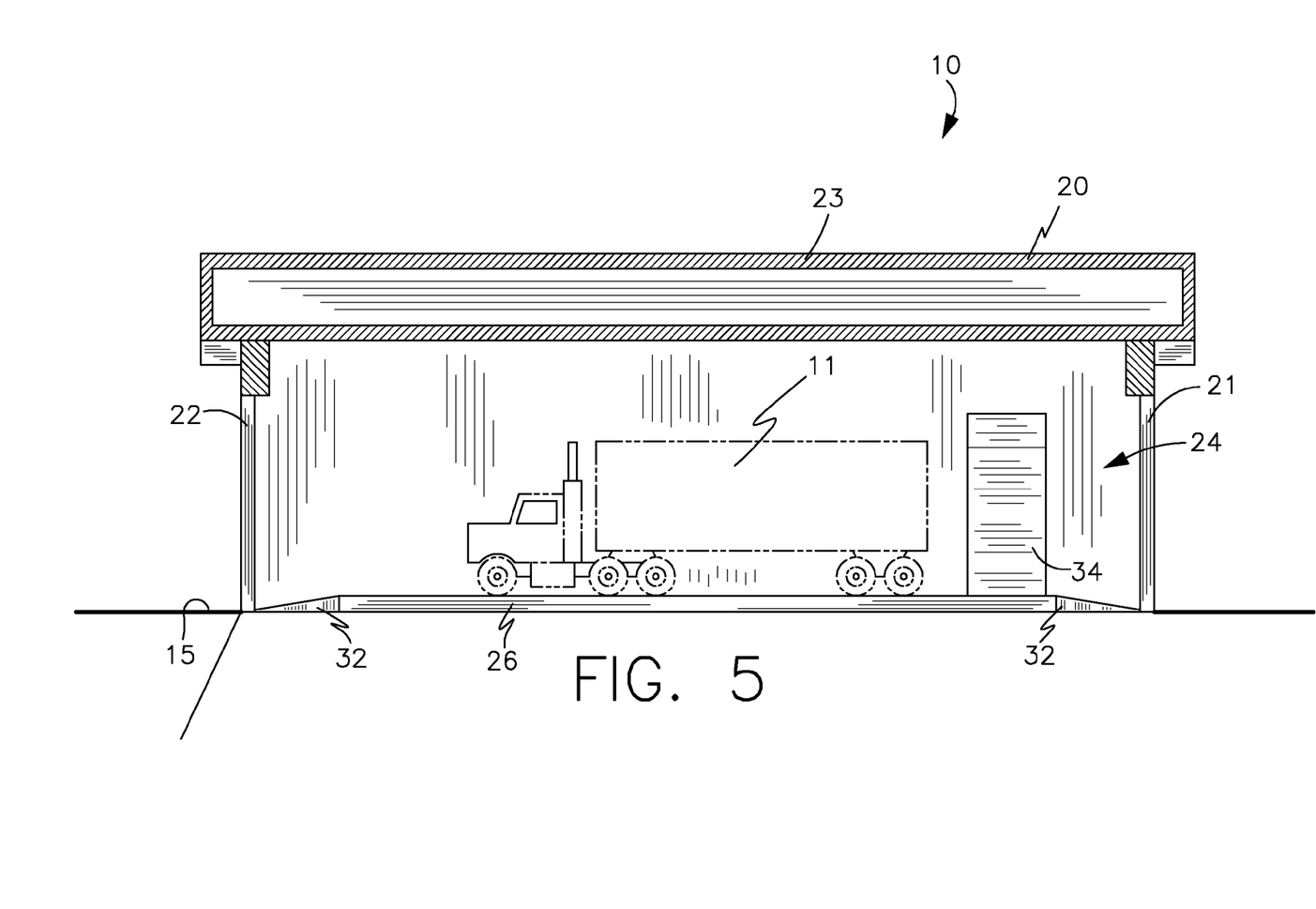
FIG. 5 is a cross sectional view of the system shown in FIG. 1, taken along line 2-7, showing the scanner positioned adjacent to the second end of the building structure during scanning procedures.
Figure 6:
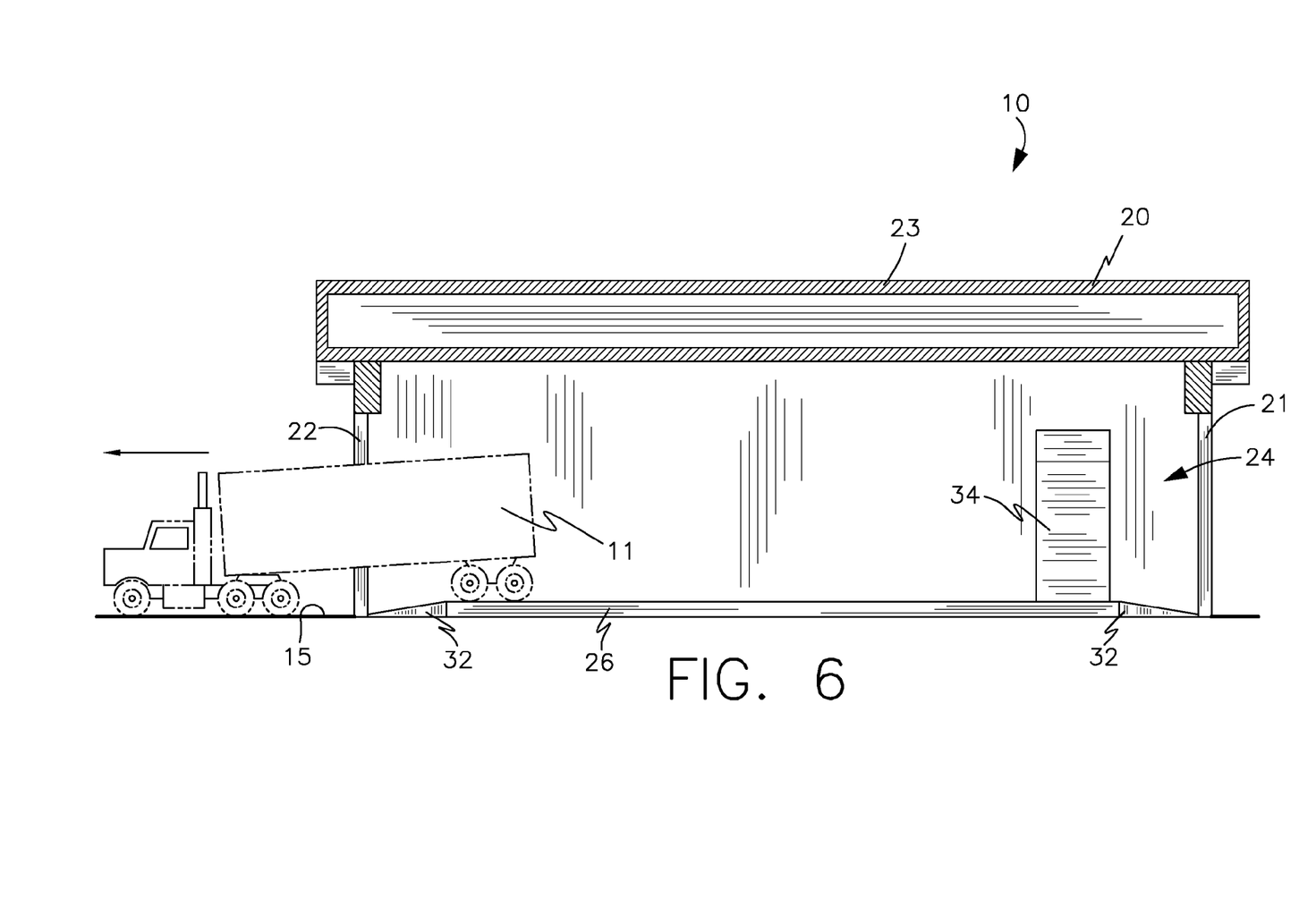
FIG. 6 is a cross sectional view of the system shown in FIG. 1, taken along line 2-7, showing the existing vehicle exiting the second end of the building structure after scanning procedures are completed.
Figure 7:
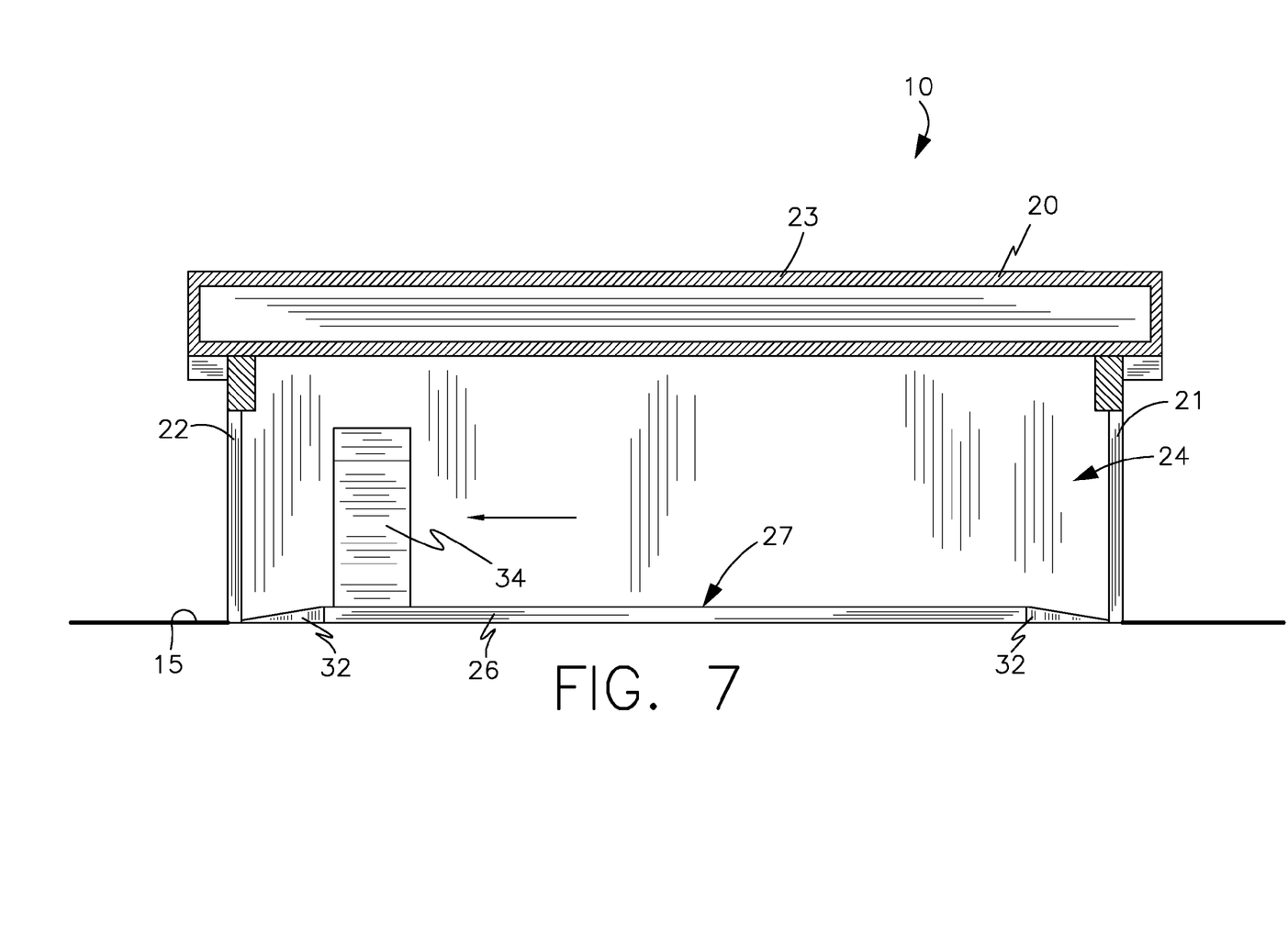
FIG. 7 is a cross sectional view of the system shown in FIG. 1, taken along line 2-7, showing the scanner in the equilibrium position.
Figure 8:
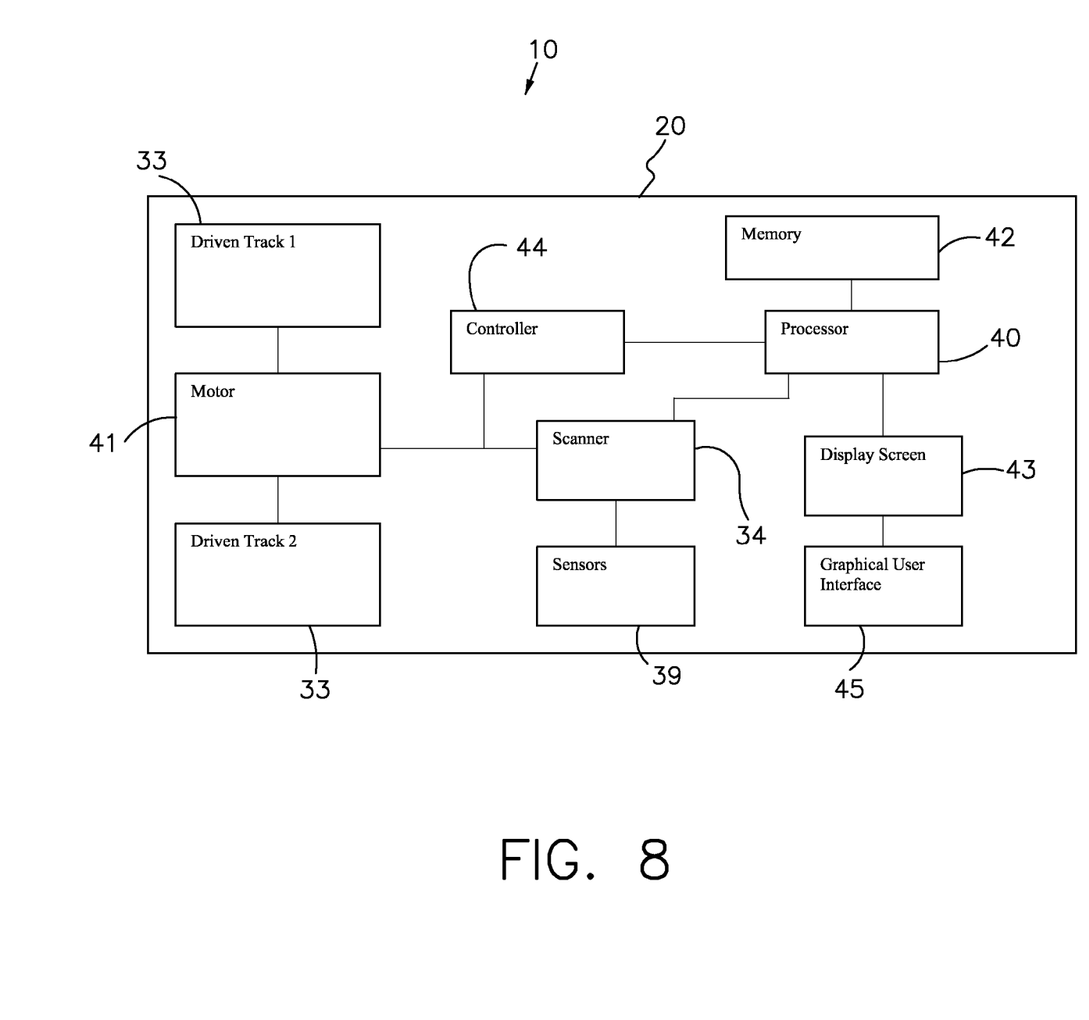
FIG. 8 is a schematic diagram of the system, in accordance with the present invention.

Referring to FIG. 8, the automatic scanning mechanism 25 further includes a plurality of driven tracks 33 housed within an interior portion of the platform 26. Each of such driven tracks 33 is located subjacent to the top surface 27 of the platform 26 and adjacent to laterally opposed outside edges 64 of the platform 26. Each of the driven tracks 33 has a longitudinal length registered parallel to the longitudinal length of the platform 26. Such longitudinal lengths of the driven tracks 33 allow the scanner 34 (herein described below) to traverse the entire length of the platform 26 during scanning procedures. A motor 41 is directly coupled to each of the plurality of driven tracks 33 respectively, without the use of intervening elements. Such a motor 41 is housed within the interior portion of the platform 26 and further is located subjacent to the top surface 27 of the platform 26. The motor 41 applies a rotational force to each of the respective driven tracks 33 simultaneously during operating conditions.

Referring to FIGS. 1, 2, 3, 4, 5, 6, 7 and 8, the automatic scanning mechanism 25 further includes a movable cargo scanner 34 that has a closed end 35 and a plurality of legs 36 oriented opposite to the closed end 35 such that an inverted U-shape is formed. Each of such legs 36 has a bottom end 37 directly attached to an associated one of the driven tracks 33, without the use of intervening elements, which allows the driven tracks 33 to move the scanner 34 along the platform 26 when a rotational force from the motor 41 is applied the respective driven tracks 33. Each of the legs 36 has a top end 38 monolithically formed with the closed end 35 of the scanner 34, which is vital such that the closed end 35 is sufficiently spaced above the top surface 27 of the platform 26 to allow the existing vehicle 11 to simultaneously pass beneath the closed end 35 and between the legs 36 of the scanner 34 respectively during scanning procedures. By allowing the existing vehicle 11 to pass below the closed end 35 of the scanner 34 and between the legs 36 of the scanner 34 respectively during scanning procedures, the operator is able to get a complete scan of the existing vehicle's 11 cargo area and the contents therein.

The scanner 34 is moved along a first linear path corresponding to the longitudinal length of the platform 26 when a rotational force from the motor 41 is applied to the driven tracks 33 during scanning procedures. The scanner 34 is moved along a second linear path opposite to the first linear path and returned to an equilibrium position when the scanning procedures are completed. The first and second linear paths extend along an entire longitudinal length of the platform 26. By returning the scanner 34 to an equilibrium position after scanning procedures are completed, the operator is then ready to scan another existing vehicle 11 that enters the structure 20.

Referring to FIG. 8, the automatic scanning mechanism 25 further includes a plurality of sensors 39 coupled to the scanner 34. Such sensors 39 detect the existing vehicle 11 positioned upon the platform 26 when the scanner 34 moves along the first linear path, which is necessary to thereby initiate the scanning procedures during operating conditions. The sensors 39 allow the scanner 34 to be automatically initiated and thereby make the scanning procedure more efficient. A processor 40 is electrically coupled to the scanner 34, and a memory 42 is electrically coupled to the processor 40. Such a memory 42 includes software instructions that cause the scanner 34 to display an image of the cargo. Such software instructions are programmable and execute a logic algorithm including the steps of capturing an image of the cargo, transmitting the image information to the processor 40, decoding the image into a plurality of independent data streams corresponding to a level of predetermined high risk materials, measuring reflected light of a specific frequency originating from the cargo, and generating an output signal corresponding to the reflected light frequency of the cargo.

Again referring to FIG. 8, the automatic scanning mechanism 25 further includes a display screen 43 electrically coupled to the processor 40 and the scanner 34 respectively. Such a display screen 43 includes a graphical user interface 45 electrically mated thereto for generating images of the cargo on the display screen 43. The display screen 43 provides visual notification to the operator of the contents of the existing vehicle 11 being scanned. Such a graphical user interface 45 receives and directly manipulates the output signal to a plurality of widgets displayed on the display screen 43, which is essential so that the operator can quickly and easily identify a threat level of the detected cargo. A controller 44 is electrically coupled to the processor 40 and the scanner 34 and the motor 41 respectively. Such a controller 44 includes a user interface that allows an operator to manually operate the scanner 34 during scanning procedures. Such manual operation of the scanner 34 allows the operator to re-scan areas of the existing vehicle 11 to clearly identify questionable cargo contained therein.

The ability to position an existing vehicle 11 upon the platform 26 within the structure 20 provides the unexpected benefit of allowing the operator to scan a multitude of existing vehicles 11 in succession easily and quickly. In addition, the system 10 scans existing vehicles 11 that are stationary, thereby giving the operator a clear visual representation of the cargo contained within the existing vehicle 11. Also, the ability of the operator to manually scan an existing vehicle 11 allows the operator to re-scan a cargo area to clarify the contents therein, thereby overcoming the prior art shortcomings.

A method 10 for providing a visual display of contents contained within the closed cargo area of an existing vehicle 11 includes the steps of providing a building structure 20 that has open first 21 and second 22 ends and a top portion 23 respectively such that a continuous passageway 24 is formed within an interior of the structure 20, and automatically scanning the cargo area of the existing vehicle 11 by moving a scanner 34 along the passageway 24 while the existing vehicle 11 remains stationary such that cargo within the existing vehicle 11 remains statically housed therein. The structure 20 is manufactured of durable and rigid material such that the structure 20 provides a barrier between the scanner 34 and the outside environment.

The method 10 further includes the steps of driving a plurality of existing vehicles 11 into the first end 21 of the structure 20 and subsequently driving the plurality of existing vehicles 11 out of the second end 22 of the structure 20. The structure 20 has a sufficient longitudinal length such that respective front 12 and rear 13 ends of the existing vehicle 11 are inwardly spaced from the respective second 22 and first 21 ends of the structure 20 in such a manner that the existing vehicle 11 is wholly contained within the interior of the structure 20 during operating conditions.

The method 10 of automatically scanning the cargo area of the existing vehicle 11 includes the steps of housing an elevated platform 26 within the interior of the structure 20. Such a platform 26 has a horizontally oriented planar top surface 27 and further has a longitudinal length equal to a longitudinal length of the structure 20. The platform 26 has a plurality of ramps 32 provided with second ends 28 monolithically formed with respective opposed ends 29 of the platform 26, and each of the second ends 28 of the ramps 32 has a vertical height equal to a vertical height of the top surface 27 of the platform 26. Each of the ramps 32 has a first end 30 extending downwardly and away from the second ends 28 and is directly abutted against a ground surface 14, without the use of intervening elements. Each of the ramps 32 has a planar top surface 31 extending between the respective first 30 and second ends 28 of the ramps 32 such that the top surfaces 31 of the ramps 32 rise vertically at a predetermined angle thereby allowing the existing vehicle 11 to be easily positioned upon the top surface 27 of the platform 26 during scanning procedures.

The method 10 of automatically scanning the cargo area of the existing vehicle 11 further includes the steps of housing a plurality of driven tracks 33 within an interior portion of the platform 26. Each of such driven tracks 33 is located subjacent to the top surface 27 of the platform 26 and adjacent to laterally opposed outside edges 64 of the platform 26. Each of the driven tracks 33 has a longitudinal length registered parallel to the longitudinal length of the platform 26. The steps further include directly coupling a motor 41 to each of the plurality of driven tracks 33 respectively, without the use of intervening elements. Such a motor 41 is housed within the interior portion of the platform 26 and further is located subjacent to the top surface 27 of the platform 26. The motor 41 applies a rotational force to each of the respective driven tracks 33 simultaneously during operating conditions.

The method 10 of automatically scanning the cargo area of the existing vehicle 11 further includes the steps of providing a movable cargo scanner 34 that has a closed end 35 and a plurality of legs 36 oriented opposite to the closed end 35 such that an inverted U-shape is formed. Each of such legs 36 has a bottom end 37 directly attached to an associated one of the driven tracks 33. Each of the legs 36 has a top end 38 monolithically formed with the closed end 35 of the scanner 34 such that the closed end 35 is sufficiently spaced above the top surface 27 of the platform 26 to allow the existing vehicle 11 to simultaneously pass beneath the closed end 35 and between the legs 36 of the scanner 34 respectively during scanning procedures.

The method 10 of automatically scanning the cargo area of the existing vehicle 11 further includes the steps of moving the scanner 34 along a first linear path corresponding to the longitudinal length of the platform 26 when a rotational force from the motor 41 is applied to the driven tracks 33 during scanning procedures, and moving the scanner 34 along a second linear path opposite to the first linear path such that the scanner 34 is returned to an equilibrium position when the scanning procedures are completed. The first and second linear paths extend along an entire longitudinal length of the platform 26.

The method 10 of automatically scanning the cargo area of the existing vehicle 11 further includes the steps of coupling a plurality of sensors 39 to the scanner 34. Such sensors 39 detect the existing vehicle 11 positioned upon the platform 26 when the scanner 34 moves along the first linear path thereby initiating the scanning procedures during operating conditions. The steps further include electrically coupling a processor 40 to the scanner 34, and electrically coupling a memory 42 to the processor 40. Such a processor 40 includes software instructions that cause the scanner 34 to display an image of the cargo.

Such software instructions are programmable and execute a logic algorithm including the steps of capturing an image of the cargo, transmitting the image information to the processor 40, decoding the image into a plurality of independent data streams corresponding to a level of predetermined high risk materials, measuring reflected light of a specific frequency originating from the cargo, and generating an output signal corresponding to the reflected light frequency of the cargo.

The method 10 of automatically scanning the cargo area of the existing vehicle 11 further includes the steps of electrically coupling a display screen 43 to the processor 40 and the scanner 34 respectively. Such a display screen 43 includes a graphical user interface 45 electrically mated thereto for generating images of the cargo on the display screen 43. Such a graphical user interface 45 receives and directly manipulates the output signal to a plurality of widgets displayed on the display screen 43 so that the operator can quickly and easily identify a threat level of the detected cargo. The steps further include electrically coupling a controller 44 to the processor 40 and the scanner 34 and the motor 41 respectively. Such a controller 44 includes a user interface that allows an operator to manually operate the scanner 34 during scanning procedures.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vehicle cargo inspection station for providing a visual display of contents contained within the closed cargo area of an existing vehicle, said cargo inspection station comprising:
   a building structure having open first and second ends and a top portion respectively such that a continuous passageway is formed within an interior of said structure; and
   means for automatically scanning the cargo area of the existing vehicle;
   wherein said automatic scanning means is movable within said passageway while the existing vehicle remains stationary such that cargo within the existing vehicle remains statically housed therein, said building structure being manufactured of durable and rigid material such that said structure provides a barrier between said automatic scanning means and the outside environment thereby protecting said automatic scanning means from damage by harsh environmental conditions;
   wherein said automatic scanning means comprises:
      an elevated platform housed within said interior of said structure and having a horizontally oriented planar top surface, said platform having a longitudinal length equal to a longitudinal length of said structure, said platform having a plurality of ramps provided with second ends monolithically formed with respective opposed ends of said platform, each of said second ends of said ramps having a vertical height equal to a vertical height of said top surface of said platform, each of said ramps having a first end extending downwardly and away from said second ends and being directly abutted against a ground surface, each of said ramps having a planar top surface extending between said respective first and second ends of said ramps such that said top surfaces of said ramps rise vertically at a predetermined angle thereby allowing the existing vehicle to be easily positioned upon said top surface of said platform during scanning procedures;
   wherein said automatic scanning means further comprises a plurality of driven tracks housed within an interior portion of said platform, each of said driven tracks being located subjacent to said top surface of said platform and adjacent to laterally opposed outside edges of said platform, each of said driven tracks having a longitudinal length registered parallel to said longitudinal length of said platform; and
   a motor directly coupled to each of said plurality of driven tracks respectively, said motor being housed within said interior portion of said platform and further being located subjacent to said top surface of said platform;
   wherein said motor applies a rotational force to each of said respective driven tracks simultaneously during operating conditions;
   wherein said automatic scanning means further comprises a movable cargo scanner having a closed end and a plurality of legs oriented opposite to said closed end such that an inverted U-shape is formed, each of said legs having a bottom end directly attached to an associated one of said driven tracks, each of said legs having a top end monolithically formed with said closed end of said scanner such that said closed end is sufficiently spaced above said top surface of said platform to allow the existing vehicle to simultaneously pass beneath said closed end and between said legs of said scanner respectively during scanning procedures;
   wherein said scanner is moved along a first linear path corresponding to said longitudinal length of said platform when a rotational force from said motor is applied to said driven tracks during scanning procedures;
   wherein said scanner is moved along a second linear path opposite to said first linear path and returned to an equilibrium position when said scanning procedures are completed;
   wherein said first and second linear paths extend along an entire longitudinal length of the platform;
   wherein said automatic scanning means further comprises a plurality of sensors coupled to said scanner, said sensors detecting the existing vehicle positioned upon said platform when said scanner moves along said first linear path thereby initiating said scanning procedures during operating conditions;
   a processor electrically coupled to said scanner;
   a memory electrically coupled to said processor and including software instructions that cause said scanner to display an image of the cargo, said software instructions being programmable and executing a control logic algorithm, said control logic algorithm including the steps of
      a. capturing an image of the cargo,
      b. transmitting said image information to said processor,
      c. decoding said image into a plurality of independent data streams corresponding to a level of predetermined high risk materials,
      d. measuring reflected light of a specific frequency originating from the cargo, and
      e. generating an output signal corresponding to the reflected light frequency of the cargo;
   a display screen electrically coupled to said processor and said scanner respectively, said display screen including a graphical user interface electrically mated thereto for generating images of the cargo on the display screen, said graphical user interface receiving and directly manipulating said output signal so that the operator can quickly and easily identify a threat level of the detected cargo; and
   a controller electrically coupled to said processor and said scanner and said motor respectively, said controller including a user interface that allows an operator to manually operate said scanner during scanning procedures.

2. The cargo inspection station of claim 1, wherein said passageway of said structure is suitably shaped and sized such that a plurality of the existing vehicles are driven into said first end of said structure and subsequently driven out of said second end of said structure, said structure having a sufficient longitudinal length such that respective front and rear ends of the existing vehicle are inwardly spaced from said respective second and first ends of said structure in such a manner that the existing vehicle is wholly contained within said interior of said structure during operating conditions.

3. A method for providing a visual display of contents contained within the closed cargo area of an existing vehicle, said method including the steps of:
   a. providing a building structure having open first and second ends and a top portion respectively such that a continuous passageway is formed within an interior of said structure; and
   b. automatically scanning the cargo area of the existing vehicle by moving a scanner along said passageway while the existing vehicle remains stationary such that cargo within the existing vehicle remains statically housed therein, said building structure being manufactured of durable and rigid material such that said structure provides a barrier between said scanner and the outside environment;
wherein step b. further comprises the steps of
   a. coupling a plurality of sensors to said scanner, said sensors detecting the existing vehicle positioned upon said platform when said scanner moves along said first linear path thereby initiating said scanning procedures during operating conditions;
   b. electrically coupling a processor to said scanner;
   c. electrically coupling a memory to said processor, said processor including software instructions that cause said scanner to display an image of the cargo, said software instructions being programmable and executing a control logic algorithm, said control logic algorithm including the steps of
      i. capturing an image of the cargo,
      ii. transmitting said image information to said processor,
      iii. decoding said image into a plurality of independent data streams corresponding to a level of predetermined high risk materials,
      iv. measuring reflected light of a specific frequency originating from the cargo, and
      v. generating an output signal corresponding to the reflected light frequency of the cargo;
   d. electrically coupling a display screen to said processor and said scanner respectively, said display screen including a graphical user interface electrically mated thereto for generating images of the cargo on the display screen, said graphical user interface receiving and directly manipulating said output signal so that the operator can quickly and easily identify a threat level of the detected cargo; and
   electrically coupling a controller to said processor and said scanner and said motor respectively, said controller including a user interface that allows an operator to manually operate said scanner during scanning procedures.

4. The method of claim 3, further including the steps of:
   c. driving a plurality of existing vehicles into said first end of said structure and subsequently driving said plurality of existing vehicles out of said second end of said structure, said structure having a sufficient longitudinal length such that respective front and rear ends of the existing vehicle are inwardly spaced from said respective second and first ends of said structure in such a manner that the existing vehicle is wholly contained within said interior of said structure during operating conditions.

5. The method of claim 3, wherein step b. comprises the steps of:
   a. housing an elevated platform within said interior of said structure, said platform having a horizontally oriented planar top surface and further having a longitudinal length equal to a longitudinal length of said structure, said platform having a plurality of ramps provided with second ends monolithically formed with respective opposed ends of said platform, each of said second ends of said ramps having a vertical height equal to a vertical height of said top surface of said platform, each of said ramps having a first end extending downwardly and away from said second ends and being directly abutted against a ground surface, each of said ramps having a planar top surface extending between said respective first and second ends of said ramps such that said top surfaces of said ramps rise vertically at a predetermined angle thereby allowing the existing vehicle to be easily positioned upon said top surface of said platform during scanning procedures.

6. The method of claim 3, wherein step b. further comprises the steps of:
   e. housing a plurality of driven tracks within an interior portion of said platform, each of said driven tracks being located subjacent to said top surface of said platform and adjacent to laterally opposed outside edges of said platform, each of said driven tracks having a longitudinal length registered parallel to said longitudinal length of said platform; and
   f. directly coupling a motor to each of said plurality of driven tracks respectively, said motor being housed within said interior portion of said platform and further being located subjacent to said top surface of said platform;
   wherein said motor applies a rotational force to each of said respective driven tracks simultaneously during operating conditions.

7. The method of claim 3, wherein step b. further comprises the steps of:
   g. providing a movable cargo scanner having a closed end and a plurality of legs oriented opposite to said closed end such that an inverted U-shape is formed, each of said legs having a bottom end directly attached to an associated one of said driven tracks, each of said legs having a top end monolithically formed with said closed end of said scanner such that said closed end is sufficiently spaced above said top surface of said platform to allow the existing vehicle to simultaneously pass beneath said closed end and between said legs of said scanner respectively during scanning procedures;
   h. moving said scanner along a first linear path corresponding to said longitudinal length of said platform when a rotational force from said motor is applied to said driven tracks during scanning procedures; and
   i. moving said scanner along a second linear path opposite to said first linear path such that said scanner is returned to an equilibrium position when said scanning procedures are completed;
   wherein said first and second linear paths extend along an entire longitudinal length of the platform.

* * * * *